United States Patent [19]

Dopkin et al.

[11] 4,282,905
[45] Aug. 11, 1981

[54] MANUFACTURE OF SEAMLESS LAMINATED TUBING

[75] Inventors: Raymond J. Dopkin; Jerome Hochberg, both of Wilmington, Del.

[73] Assignee: E. I. Du Pont de Nemours and Company, Wilmington, Del.

[21] Appl. No.: 938,800

[22] Filed: Sep. 1, 1978

[51] Int. Cl.³ ............... F16L 11/00; B32B 31/16; B65C 3/26; B29C 17/00
[52] U.S. Cl. ............... 156/74; 138/DIG. 3; 138/125; 156/156; 156/187; 156/287; 428/36; 428/253
[58] Field of Search ............... 156/156, 287, 306, 309, 156/333, 74, 149, 187; 427/412; 428/36, 96, 212, 213, 251, 253, 215, 422; 138/DIG. 3, 141, 124, 125; 526/254

[56] References Cited

U.S. PATENT DOCUMENTS

| 2,593,714 | 4/1952 | Robinson | 156/156 |
|---|---|---|---|
| 2,690,769 | 10/1954 | Brown | 138/55 |
| 2,724,672 | 11/1955 | Rubin | 156/287 |
| 2,731,068 | 1/1956 | Richards | 138/DIG. 3 X |
| 2,783,173 | 2/1957 | Walker et al. | 156/323 |
| 2,810,424 | 10/1957 | Swartswetter et al. | 156/172 |
| 2,833,686 | 5/1958 | Sandt | 428/422 X |
| 3,108,018 | 10/1963 | Lewis | 428/422 X |
| 3,723,234 | 3/1973 | MacDonald | 428/175 |
| 3,934,064 | 1/1976 | Lowthian | 428/174 X |
| 3,946,196 | 3/1976 | Fitz et al. | 428/422 |
| 4,104,095 | 8/1978 | Shaw | 138/125 |
| 4,112,159 | 9/1978 | Pall | 428/36 |
| 4,132,577 | 1/1979 | Wintermantel | 156/156 |
| 4,144,632 | 3/1979 | Stroupe | 156/156 X |
| 4,165,404 | 8/1979 | Quehl | 138/141 |

Primary Examiner—William R. Dixon, Jr.
Attorney, Agent, or Firm—James H. Ryan

[57] ABSTRACT

Tubing of a thermoplastic polymer for handling corrosive materials is laminated or reinforced by covering the same with a heat-softenable bonding agent as an adhesive, inserting the adhesive-covered tube in a cylindrical glass fabric sleeve, inserting the assembly in a hollow cylinder, heating the tube to a temperature to cause the softening of the bonding agent and adhesion to the tube, forcing the tube with air or centrifugal force against the inside of the cylinder to force softened bonding agent into the interstices of the glass fabric, and cooling the entire assembly while expanded to adhere the bonding agent to the fabric and thereby form a unitary structure. The reinforced tube can be bonded to the inside of a preformed steel or fiberglass-reinforced plastic pipe to serve as a protective liner therefor.

12 Claims, 4 Drawing Figures

MANUFACTURE OF SEAMLESS LAMINATED TUBING

BACKGROUND OF THE INVENTION

1. Field of the Invention

This invention relates to the production of seamless reinforced polymeric thermoplastic tubing for use with corrosive chemicals either alone or as a fixed lining for more rigid tubing.

2. Prior Art

Steel pipes loose-lined with polymeric fluorocarbon liners, e.g., of Teflon ®, are available commercially for corrosive chemicals.

Lowthian U.S. Pat. No. 3,934,064 shows making cylinders by wrapping flat fluorocarbon laminate around a mandrel.

Sandt U.S. Pat. No. 2,833,686 discloses (Example 5) that polymerized fluorocarbon linings can be bonded to the inside of iron pipe by the use of adhesives, heat and applied air pressure.

SUMMARY OF THE INVENTION

A reinforced seamless thermoplastic tube, e.g., of Teflon ®, is produced by covering a preformed seamless tube of a thermoplastic polymer with a suitable adhesive, encasing the covered tube in a reinforcing sleeve or stocking, e.g., of knit fiberglass, inserting the assembly in a hollow cylinder, pressurizing the inside of the tube with compressed air or centrifugal force while heated to about the softening point of the polymer to expand it and force adhesive into the fiberglass sleeve, cooling the assembly and reducing the pressure to atmospheric. The laminated tube can be slipped within and glued to the inside of a preformed polyester-glass or metal pipe, if desired.

DESCRIPTION OF THE DRAWINGS

The drawings illustrate the practice of the invention wherein.

DESCRIPTION OF THE INVENTION

Figure 1:
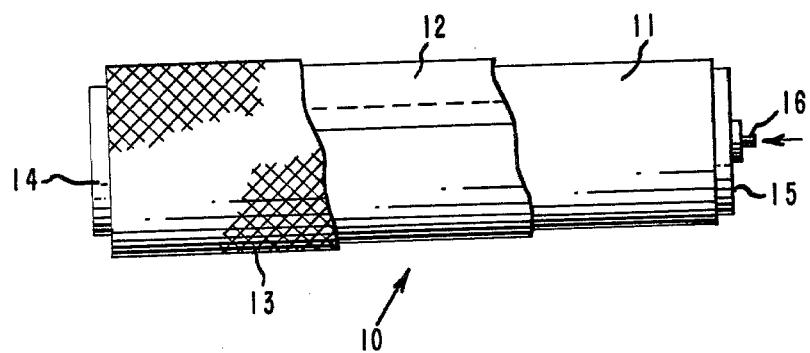
FIG. 1 shows a cylindrical tube assembly 10, partially cut away, ready to be pressurized. Assembly 10 comprises a tube 11 of a fluoropolymer covered with fluoropolymer film 12, both within tubular knit glass fabric sleeve 13. Solid end plug 14 blocks one end of tube 11 while end plug 15 carries gas inlet 16 to admit air under low pressure.

Fluorinated polymers are particularly useful in handling corrosive liquids and the like because of their chemical inertness. They are, however, not as strong physically as is sometimes desirable, and thus it is necessary to support them, e.g., as by placing them in steel pipe. They are inert to most adhesives (except for other fluoropolymers) and difficult to fix or join to metallic surfaces. Adhering the fluoropolymer to a material such as a glass fabric provides a surface which can readily be adhered to metals.

Adhering the glass and the fluoropolymer can be accomplished with flat sheets that can be rolled into cylinders. Although then fused at the contacting edges, these cylinders have seams constituting a weakness in their structure.

Seamless fluoropolymeric tubes prefabricated as by extrusion can be obtained commercially and, in the present invention, are directly reinforced or laminated. Tubes of any desired length and diameter can be used. Between 0.5 and 16 inches in diameter is normal. The tubing wall generally has a thickness of from 5-100 mils. Preferably, the thickness will be from 20-100 mil, more preferably, 50-100 mil.

Fluorocarbon polymers usable in this tubing comprise those shown by art such as that cited above, e.g., the melt-fabricable perhalopolyfluoroethylene copolymers. These copolymers include chlorotrifluoroethylene and tetrafluoroethylene (TFE) copolymerized with fluoroolefins such as hexafluoropropylene, or with perfluoroalkyl vinyl ether monomers such as perfluoropropyl- or ethyl-vinyl ether, or with nonfluoroinated monomer such as alkylenes, e.g., ethylene, including the tetrafluoroethylene/ethylene binary polymers and terpolymers.

In general, the tubing will be composed of a fluorocarbon copolymer having a specific melt viscosity higher than that of the fluorocarbon adhesive employed, itself a fluorocarbon polymer. Preferably, the specific melt viscosity of the tubing polymer will be $30-60 \times 10^4$ poises, and more preferably, from $40-60 \times 10^4$ poises. These are preferred because of their good mechanical properties and availability.

By the term "specific melt viscosity" as used herein is meant the apparent melt viscosity as measured at 372° C. under a shear stress of 6.5 pounds per square inch. The values herein referred to are determined using a melt indicator of the type described in the American Society of Testing Materials Test D-1238-57 T, modified for corrosion resistance to embody a cylinder and orifice of "Ampco" aluminum bronze and a piston weighing 60 grams, having a "Stellite" cobalt-chromium-tungsten alloy tip. The resin is charged to the 0.375- inch I.D. cylinder which is held at 372° C.±0.5° C., allowed to come to an equilibrium temperature during 5 minutes, and extruded through the 0.0825-inch diameter, 0.315-inch long orifice under a piston loading of 5,000 grams. The specific melt viscosity in poises is calculated as 53,150 divided by the observed extrusion rate in grams per minute.

The lower specific melt viscosity of the copolymer of the adhesive allows it to be flowable at the temperatures required to laminate the tubing to the laminating material used. This flowability enables the adhesive copolymer to wet and be embedded into the laminating material and also to fuse with the fluorocarbon copolymer of the tubing.

Any melt-fabricable adhesive for fluoropolymers can be used to bond or assist in bonding the tubing to its laminate. In general, fluorinated copolymers will be used and applied in the form of a thin film usually wrapped around the tubing. It should be noted that in one aspect of the invention, however, the adhesive film is omitted and the polymer of the tubing acts as its own bonding agent.

The fluorocarbon copolymer adhesive is employed in the form of a thin film with a thickness of from a minimum of about 1 mil (at this thickness, handling difficulties occur), to a maximum of about 10 mils. Preferred because of availability and ease of handling is a thickness of 2-5 mil. The adhesive will be composed of a fluorocarbon copolymer having a sufficiently low specific melt viscosity to enable the copolymer to wet and penetrate the laminating material at fabricating temperature.

Although the fluorocarbon copolymer adhesive is preferably utilized as a preformed film, usually wrapped around the tubing, it can also be used as a freshly formed extrudate applied prior to its being completely cooled, or as a dispersion or paste containing the fluorocarbon copolymer which is applied in several coats until the minimum thickness of about 1 mil is obtained.

The reinforcing agent useful in the present invention is in the form of a cylindrical sleeve made from a fabric which can be woven or knit. The sleeve can be made from a flat sheet rolled into a cylinder with the edges merely touching, sewed together, or overlapping. Preferably, however, the sleeve is a seamless cylinder woven or knit as such.

Woven fabrics are those characterized by any of the well-known crisscross weaves and by moderate or low elongation or extension along either major axis of the fiber weave.

Preferably, the fabric is composed of continuous yarn or set of yarns in the form of courses or rows of loops, each row of loops being caught in the previous row of loops, and can be described as knit. Any type of knit can be used in the fabric. For example, in addition to the plain pearl knit, such knits as the flat jersey knit, the raschel knit, the rib stitch and the tricot stitch can be used. Fabrics that are knitted double and are held together by binding stiches, which are known as double knit fabrics, can also be used. Variations on the basic knitting stitch can be used, such as the tuck stitch, wherein periodically the knitting operation loops at desired intervals are left unknitted so as to form knobby or bumpy surface on one or both sides of the knitted fabric which increases its apparent thickness. All these types of knits have in common the feature of the loops of the yarn making up the fabric extending from each surface of the fabric, and of being extensible in all directions. Generally, an extensibility without breaking of at least 10% in all directions is desired for a knit fabric, with some applications requiring at least 20% extensibility based on the original dimension of the fabric.

The laminated tubing incorporating the fabric (whether woven or knit) will have a relatively corresponding extensibility or lack of extensibility.

The fabric can be knit or woven from any fiber which is inert, i.e., has temperature stability at the temperature or temperatures required during the processing. Suitable fibers include natural or synthetic fibers, including, for example, metal, polyimide, carbon fibers, glass fibers, graphite fibers, ceramic fibers, asbestos fibers, aromatic aramide fibers, etc. Because of their desirable physical properties, glass fibers are preferred for the invention. Glass fiber yarn is frequently used instead of glass monofilament because of the relative fragility of the monofilament.

When the fabric is woven, carbon and graphite fibers are particularly preferred. When the fabric is knit, glass and aromatic aramide fibers are particularly preferred.

Figure 2:
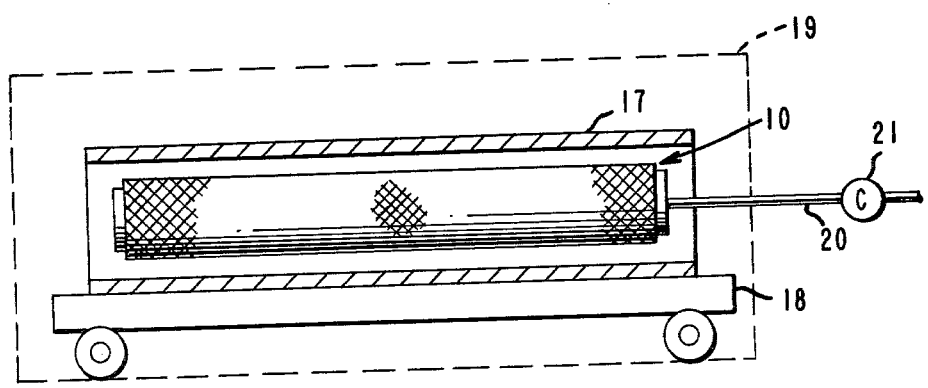
FIG. 2 shows tube assembly 10 inserted for convenience within hollow metal cylinder 17 to insure even heating and to prevent ballooning of the tube 11. Cylinder 17 may be put on cart 18 and placed in oven 19. Air hose 20 is connected to gas inlet 16 and extends through oven 19 to air compressor 21. If desired, a multiplicity of cylinders as in a honeycomb rack (not shown), each containing a tube assembly, can be placed on the cart. The cart is moved into the oven, and all the fluoropolymer tubes are heated and pressurized simultaneously.

Seamless pipes can be formed simply by the process of this invention as illustrated in FIGS. 1 and 2. The ends of an originally seamless polymeric fluorocarbon tube of appropriate size are firmly plugged, with an air inlet in one plug, and the tube wrapped with a film of any melt-fabricable fluoropolymer selected as an adhesive. Tubular glass fabric is pulled over the tube and smoothed. The resultant assembly can be heated in any appropriate manner, but preferably is inserted in a hollow heat-conductive (usually metallic) cylinder and an air supply attached to the air inlet. Air pressure, i.e., $\frac{1}{2}$-10 psig, is applied and the assembly placed in an oven, heated above the softening temperature of the adhesive, and maintained at this temperature for 5-30 minutes. The assembly is removed from the oven and immediately cooled while still under pressure with a fine water spray. A heavy stream of water should preferably not be used since it can cause warpage unless uniformly applied. Natural covection cooling is not preferred since it extends the time at high temperature and causes excessive penetration of the copolymer into the glass fabric. After the assembly cools, the air pressure is turned off and the end plugs removed.

It will be understood that modifications can be made in the process described. A plurality of pipes can be formed simultaneously by heating a number of filled cylinders at the same time, as in the honeycomb rack noted above. Pressure, temperature and time at temperature can also be varied to some extent, since the same result can be obtained using various combinations of the three. Furthermore, these quantities will vary with the polymers used and with the composition of the adhesive. Additional steps can also be included in the procedure outlined such as flangeing the ends of the pipes, possible because of the elastic nature of both polymer and certain glass fabric constructions.

Figure 3:
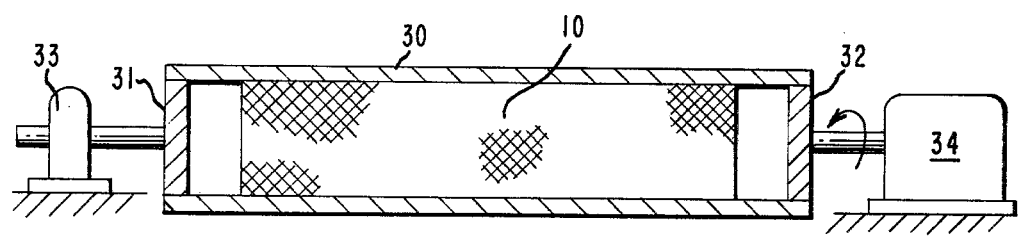
FIG. 3 illustrates an alternative method of laminating a fluoropolymeric tube to a fiberglass sleeve. In this method, a cylindrical assembly 10 with a polymeric tube covered with a fluoropolymeric film and encased in a glass fabric (not specifically illustrated) is mounted in a heat-conductive (preferably metallic) cylinder 30 with plugs 31 and 32 at the ends. Plug 31 is rotatably connected to support 33 while plug 32 is connected to motor 34. In operation, heat is applied in any convenient way to cylinder 30, e.g., by torches, not shown, and the cylinder rapidly rotated. The tube expands, due to centrifugal force, and with the film is forced into the interstices of the fiberglass sleeve.

An alternative procedure for expanding polymer into the interstices of a surrounding fabric is shown in FIG. 3. Here the wrapped tube assembly is heated above the softening point of the polymer and revolved rapidly, e.g., at 1000 rpm or more (depending on tube diameter), around its longitudinal axis. Although the tube loses strength, high temperature, e.g., 250°-300° C., can be employed because centrifugal force not only extrudes polymer into the fabric but prevents the tube from collapsing.

Figure 4:
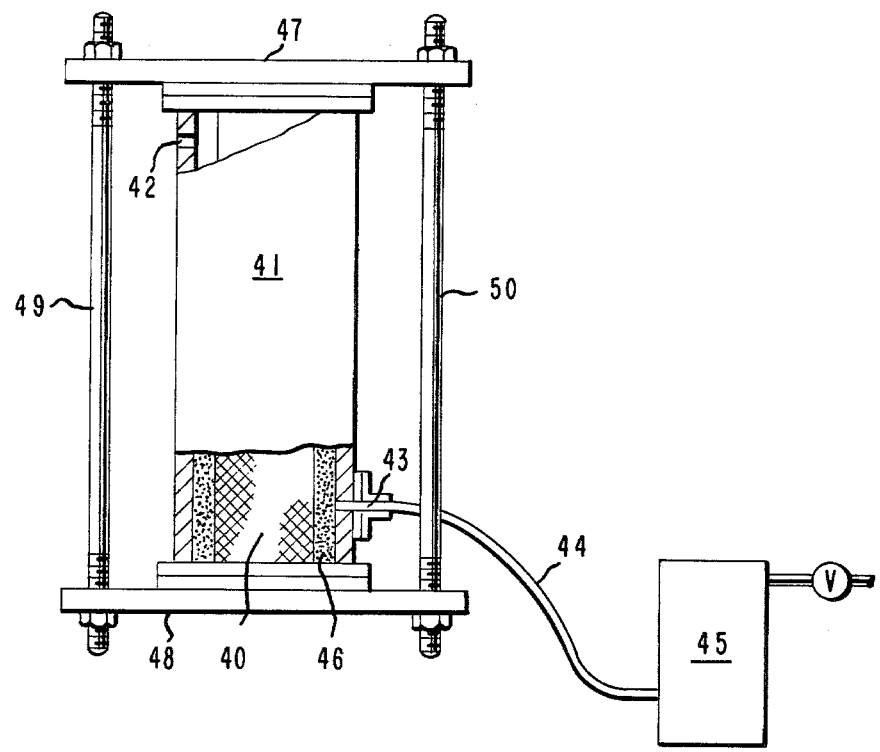
FIG. 4 illustrates the bonding of a complete assembly 40 to metal pipe 41 with holes 42 and 43 at its ends. Assembly 40 is the same as assembly 10 except that the three components, the polymeric tube, the film, and the fiberglass sleeve, have been laminated together as illustrated above. The ends of pipe 41 are closed by plates 47 and 48 held together as by rods 49 and 50. Gaskets and other supports may be utilized as is convenient. Feed line 44 connects hole 43 to pressure pot 45 containing adhesive 46 which can be forced into the space between assembly 40 and pipe 41.

The seamless laminated tubes of this invention are useful in themselves in handling various corrosive materials. They are also useful as liners for physically stronger materials such as steel and fiberglass. They can readily be bonded to the inside of preformed steel or fiberglass reinforced plastic pipes and form a unitary system therewith, e.g., as shown in FIG. 4. Any bonding agent that will adhere to the external pipe and will withstand the service temperature employed can be used, e.g., vinyl esters or epoxy resins. Adhesion of the various materials can be improved by abrading the surfaces involved, by drawing a vacuum to suck the adhesive into the space between the inner and the outer pipes, by deaerating the adhesive before use, or by saturating the fiberglass with adhesive before assembly.

Alternatively, light unitary structures can be formed directly on the laminated tube by conventional filament winding or hand lay-up of fiber reinforced plastic, e.g., epoxy, polyester with fiberglass mat, roving, etc.

While the discussion above has been largely restricted to fluoropolymers, of great commercial importance, the techniques described need not be so restricted. They are obviously applicable to other thermoplastic materials, especially to those relatively inert to caustic or corrosive substances such as polyethylene, polypropylene, polyvinyl chloride, or other piping material inert to a particular destructive chemical.

There follow some examples illustrating aspects of the invention. Examples 1 and 2 show forcing softened fluoropolymer into the interstices of a glass sleeve, Example 1 by air pressure and Example 2 by centrifugal force. Example 3 shows bonding a seamless laminated tube to reinforcing outer pipe as a liner.

EXAMPLE 1

A piece of preformed seamless tubing made of a fluoroethylene/hexafluoropropylene copolymer (16% by weight hexafluoropropylene; about $50 \times 10^4$ poises specific melt viscosity at 372° C.) is cut into an 8-foot length. The tubing has an outside diameter of 10" and a wall thickness of 100 mils. The ends of the tubing are plugged, an air inlet being put in one end. The plugged tubing is laid upon a table and wrapped with a sheet of film of copolymer having the same composition as the tubing but a lower specific melt viscosity (about $8 \times 10^4$ poises at 372° C.). The film is of 2-mil thickness. Tubular knit glass fabric about 0.03 inch thick is pulled over the wrapped tube, smoothed and bound securely at the ends.

As illustrated in FIG. 2, the fabric-covered tubing is inserted into a hollow cylinder, and air-supply and pressure-gauge lines and a thermometer (not shown) are attached thereto. Air pressure (1 psi) is applied and the assembly placed in an oven preheated to 320° C. and allowed to heat up to 300° C. over a period of about 30 minutes. The temperature of the oven is then reduced and maintained at 300° C. for 20 minutes. The assembly is removed from the oven, air pressure is raised to 3 psi, and the assembly is cooled to ambient temperature with fine water spray. Air pressure is turned off and the laminated tube removed from the hollow cylinder. Peel tests show that the glass fabric is firmly adhered to the fluorocarbon tube. Tests show a peel strength ranging from 15 to 30 lb/in.

EXAMPLE 2

Into the apparatus as illustrated in FIG. 3 is inserted a fluoropolymeric tube fitted into a fiberglass sleeve with a fluorocarbon film between them. The cylinder is rotated at 1000 rpm and heated above the softening point of the polymer, e.g., to 280° C. While the polymer has insignificant strength at this temperature, the tube does not collapse because of centrifugal force. Rotation is continued at 1000 rpm for 5 minutes. The heat is removed and the cylinder rotated for about 3 additional minutes while cooling. The fluoropolymeric tube is found to be forced within and adhered to the fiberglass sleeve as in Example 1.

EXAMPLE 3

A laminated tube as produced by the method of either Example 1 or 2 is placed within a fiber-reinforced plastic pipe about 30 inches long and mounted as shown in FIG. 4. As adhesive, 1000 g of Derakane ® 470-36 containing 10 cc of methyl ethyl ketone peroxide and 2 cc of cobalt naphthenate, is placed in pressure pot 45 and forced into the space between the steel pipe and the inner tube assembly. Upon standing overnight, the adhesive forms a bond between the outer pipe and the inner laminated polymeric tube. The bond is brittle and relatively easily broken. Derakane ® 470 is a vinyl ester resin available from the Dow Chemical Company and used to make laminated piping. Methyl ethyl ketone peroxide and cobalt naphthenate are curing agents for Derakane ® 470.

We claim:

1. The process of forming a laminated pipe which comprises:
   (1) placing a tube of chemically inert thermoplastic polymer within a close-fitting seamless sleeve of fabric made from an inert fiber;
   (2) heating the tube to the softening temperature of the polymer;
   (3) expanding the softened tube by inflation or centrifugal force, thereby forcing the softened polymer between the interstices of the fabric sleeve; and
   (4) cooling the tube while polymer is still within the sleeve so that an integral pipe is formed by means of a bond between the polymer and the fabric.

2. The process of claim 1 wherein the tube is seamless.

3. The process of claim 2 wherein the fabric sleeve is made of fiberglass.

4. The process of claim 2 wherein the thermoplastic polymer is a fluorinated polymer.

5. The process of claim 4 wherein an adhesive for fluorinated polymers is inserted between the seamless tube and the sleeve before heating.

6. The process of claim 5 wherein the adhesive for fluorinated polymers is a film of the same fluorinated polymer that forms the seamless tube but has a lower specific melt viscosity.

7. The process of claim 4 wherein the fluorinated polymer of the seamless tube is a tetrafluoroethylene/hexafluoropropylene copolymer.

8. The process of claim 1 wherein the tube placed within the sleeve is inserted into a hollow heat-conducting cylinder before it is heated.

9. A laminated seamless tube comprising a seamless cylindrical thermoplastic liner and a seamless cylindrical fabric sleeve around the liner, there being a bond between the liner and the sleeve formed by thermoplastic material forced within the sleeve.

10. A tube of claim 9 wherein the liner is made from a fluoropolymer.

11. A seamless tube of claim 10 wherein the bond is formed by fluoropolymer forced within the sleeve.

12. A seamless tube of claim 10 comprising additionally an adhesive film of fluoropolymer between the liner and the fabric.

* * * * *

UNITED STATES PATENT OFFICE
CERTIFICATE OF CORRECTION

PATENT NO. : 4,282,905
DATED : August 11, 1981
INVENTOR(S) : Raymond J. Dopkin, et al It is certified that error appears in the above-identified patent and that said Letters Patent are hereby corrected as shown below:

Cancel Claims 9, 10, 11 and 12.

On the Title page :

"12" claims should read -- 8 claims --.

Signed and Sealed this

Twenty-fourth Day of August 1982

[SEAL]

Attest:

GERALD J. MOSSINGHOFF

Attesting Officer     Commissioner of Patents and Trademarks